United States Patent [19]

Kuwaoka et al.

[11] Patent Number: 4,847,873
[45] Date of Patent: Jul. 11, 1989

[54] INTERFACE CIRCUIT

[75] Inventors: Toshiharu Kuwaoka; Minoru Kanai, both of Yokohama, Japan

[73] Assignee: Victor Company of Japan, Ltd., Japan

[21] Appl. No.: 61,314

[22] Filed: Jun. 11, 1987

[30] Foreign Application Priority Data

Jun. 13, 1986 [JP] Japan ................................ 61-136058
Jun. 13, 1986 [JP] Japan ................................ 61-136059

[51] Int. Cl.$^4$ ............................................. H03D 1/03
[52] U.S. Cl. ........................................ 375/99; 375/3; 375/36; 455/601
[58] Field of Search .................. 375/3, 4, 3.1, 94, 118, 375/36.99; 455/600, 601, 602, 606, 613

[56] References Cited

U.S. PATENT DOCUMENTS

| | | | |
|---|---|---|---|
| 3,794,841 | 2/1974 | Cosentino et al. | 455/613 |
| 4,054,747 | 10/1977 | Pachynski, Jr. | 375/118 |
| 4,168,427 | 9/1979 | Hubbard | 455/606 |
| 4,211,920 | 7/1980 | Wakabayashi | 455/601 |
| 4,228,323 | 10/1980 | Feiner et al. | 455/602 |
| 4,501,022 | 2/1985 | Oswald | 455/601 |
| 4,596,048 | 6/1986 | Dunki-Jacobs | 455/602 |
| 4,598,412 | 7/1986 | Yoshida | 375/94 |
| 4,697,275 | 9/1987 | Laue | 455/601 |
| 4,710,976 | 12/1987 | Wakabayashi | 455/601 |

FOREIGN PATENT DOCUMENTS

| | | |
|---|---|---|
| 0044685 | 1/1982 | European Pat. Off. |
| 1061985 | 3/1967 | United Kingdom . |
| 1291992 | 10/1972 | United Kingdom . |
| 2168575 | 6/1986 | United Kingdom . |

*Primary Examiner*—Robert L. Griffin
*Assistant Examiner*—Stephen Chin
*Attorney, Agent, or Firm*—Lowe, Price, LeBlanc, Becker & Shur

[57] ABSTRACT

An interface circuit transmits a digital data signal from a transmission unit to a reception unit via a coupling device. The interface circuit includes a device removing jitter components from the digital data signal. The interface circuit also includes a device removing high frequency noise components from the digital data signal. The jitter removing device and the noise removing device may be disposed in either of the transmission unit and the reception unit.

4 Claims, 9 Drawing Sheets

INTERFACE CIRCUIT

BACKGROUND OF THE INVENTION

1. Field of the Invention

This invention generally relates to an interface circuit for digital signal transmission or communication between separate devices, and specifically relates to an interface circuit for digital sound or video signal transmission between separate devices in an audio system or a video system.

2. Description of the Prior Art

Advanced audio or video systems handle sound or display data in the form of digital signals at certain stages. In these systems, the digital data signals are finally converted into corresponding analog data signals. The deterioration in quality of such a reproduced analog data signal mainly results from the following two causes:

(1) A failure in accurate transmission and digital-to-analog (D/A) conversion of a digital data signal;

(2) Contamination of an analog data signal caused by the ingress of noises which are contained in a digital data signal or which are generated in a digital signal processing unit.

One known way of removing the previously-mentioned cause (2) of the signal deterioration is to dispose a digital signal processing unit and a D/A converting and analog signal processing unit in separate chassis respectively to reduce or prevent interference between the two units. In some cases, these two units in the separate chassis are housed in a common cabinet. In other cases, they are housed in separate cabinets respectively.

In digital audio systems, another known way of removing the previously-mentioned cause (2) of the signal deterioration is to use a photocoupler in an interface circuit performing digital signal transmission from a digital signal processing unit (a signal transmitting unit) to a D/A converting and analog signal processing unit (a signal receiving unit). In this interface circuit, a digital signal is transmitted between the two units via the photocoupler. The photocoupler enables electrical isolation between the two units while maintaining the signal transmission between them. According to this electrical isolation, the two units are generally activated by separate power supplies and grounds of the two units are separate. The electrical isolation is advantageous in that if a ground current of the signal transmitting unit is varied by a change of a condition such as a change of a load of the related power supply, the variation in the ground current of the signal transmitting unit will not be transmitted to the signal receiving unit. Furthermore, the electrical isolation including the ground isolation is usually effective in cutting off common mode noises.

Generally, such a known photocoupler-based interface circuit is useless in removing the previously-mentioned cause (1) of the signal deterioration. Specifically, in this known interface circuit, once a digital sound signal has unwanted components such as jitters, noises, or ripples, a corresponding analog sound signal will be deteriorated by these unwanted components. The deteriorated analog sound signal lowers tone quality and fidelity in sound reproduction.

SUMMARY OF THE INVENTION

It was found that removal of both the previously-mentioned causes (1) and (2) of the signal deterioration ensures excellent tone quality and fidelity in sound reproduction in a digital audio system. This invention is based on this fact. It should be noted that this invention is not limited to application to a digital audio system. This invention can also be applied to digital systems such as a digital video system.

It is an object of this invention to provide an interface circuit which can remove unwanted components such as jitters, noises, or ripples from a transmitted digital signal.

It is a specific object of this invention to provide an interface circuit for a digital audio or video system which can remove the previously-mentioned cause (1) of the signal deterioration in addition to the previously-mentioned cause (2) of the signal deterioration and thereby which can ensure excellent fidelity in sound or image reproduction.

In an interface circuit for transmitting a digital data signal according to a first aspect of this invention, a device removes jitter components from the digital data signal. Another device removes high frequency noise components from the digital data signal.

In an interface circuit for transmitting a binary data signal according to a second aspect of this invention, the binary data signal changes between two different level states in accordance with data. A device removes high frequency noises from the binary data signal. The noise removing device includes an element for generating light when supplied with a current and interrupting light generation when supplied with no current. Current supply to the light generating element is allowed and inhibited in accordance with change of the binary data signal between the two different level states. The light generating element thereby generates an optical binary signal corresponding to the binary data signal. The optical binary signal is converted into a corresponding electrical binary signal. The current supplied to the light generating element is regulated at a fixed level.

BRIEF DESCRIPTION OF THE DRAWINGS

Like and corresponding elements are denoted by the same reference characters throughout the drawings.

DESCRIPTION OF THE FIRST PREFERRED EMBODIMENT

Figure 1:
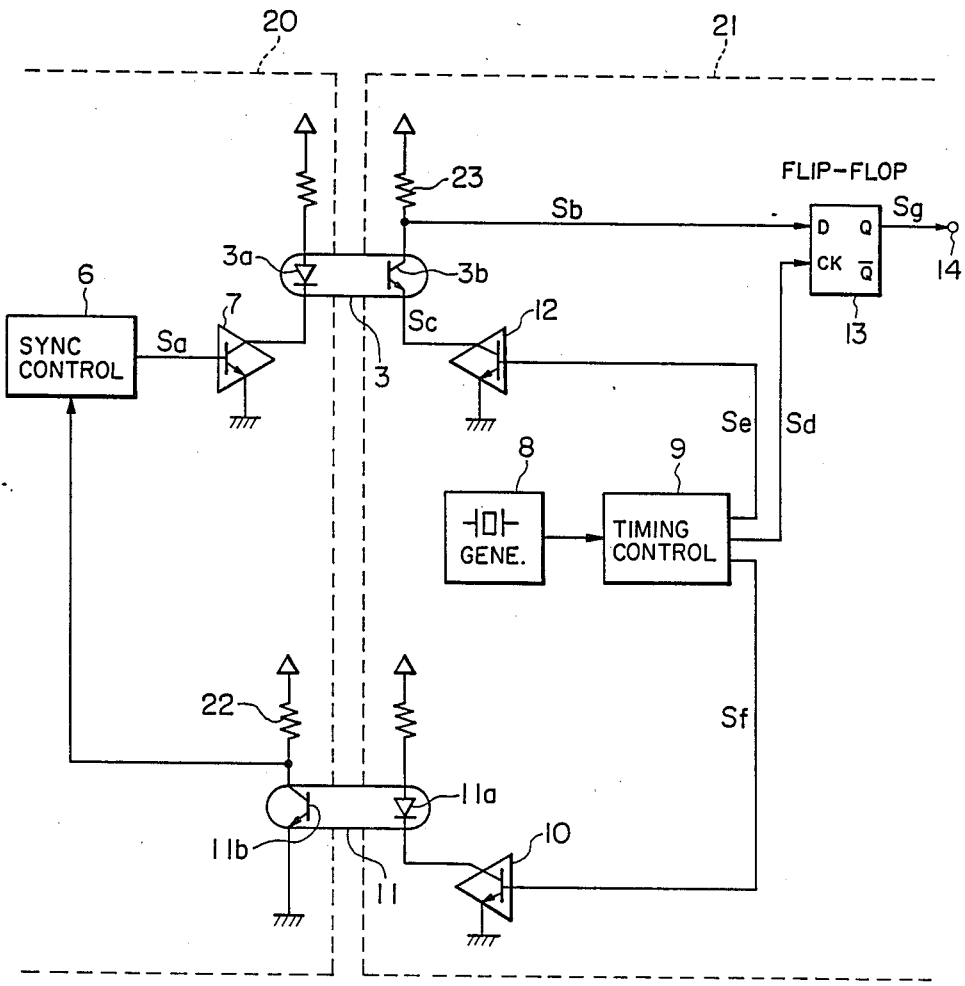
FIG. 1 is a diagram of an interface circuit according to a first embodiment of this invention.

With reference to FIG. 1 showing a first embodiment of this invention, a digital signal processing unit includes a signal transmission circuit 20. A digital-to-analog (D/A) converting and analog signal processing unit includes a signal reception circuit 21 optically connected to the transmission circuit 20 via photocouplers 3 and 11. The transmission circuit 20 outputs an optical data signal to the reception circuit 21 via the photocoupler 3. The reception circuit 21 outputs an optical synchronizing signal to the transmission circuit 20 via the photocoupler 11.

The transmission circuit 20 and the reception circuit 21 are mutually electrically isolated to remove the previously-mentioned cause (2) of the signal deterioration. Specifically, the transmission circuit 20 and the reception circuit 21 are activated by separate power supplies (not shown) respectively. Grounds of these circuits 20 and 21 are mutually separated. The transmission circuit 20 and the reception circuit 21 are preferably disposed in separate chassis respectively. In addition, these circuits 20 and 21 except their portions providing the optical connections via the photocouplers 3 and 11 are preferably mutually separated by shields (not shown).

The transmission circuit 20 includes a synchronous control circuit 6 outputting a synchronized digital or binary data signal Sa. An output terminal of the synchronous control circuit 6 is connected to an input terminal of a driver 7 so that the digital data signal Sa is applied to the driver 7. The driver 7 preferably includes a switching transistor which is made conductive and unconductive in accordance with change of the digital data signal Sa between two different level states. For example, the driver 7 is made conductive and unconductive when the digital data signal Sa assumes a logic state "0" and a logic state "1" respectively. An output terminal of the driver 7 is connected across a constant voltage source (not shown) via a light-emitting diode (LED) 3a of the photocoupler 3 and a fixed resistor (no reference character).

When the digital data signal Sa assumes a first level state or a logic state "0", the driver 7 is made conductive so that a current from the voltage source flows through the LED 3a. This current activates the LED 3a so that the LED 3a emits light. When the digital data signal Sa assumes a second level state or a logic state "1", the driver 7 is made unconductive so that the current flow through the LED 3a is interrupted. The interruption of the current flow through the LED 3a deactivates the LED 3a so that the light emission from the LED 3a is also interrupted. In this way, the LED 3a generates an optical binary signal which corresponds to the digital data signal Sa.

The synchronous control circuit 6, the driver 7, the LED 3a, the section for supplying current to the LED, and the connections between them are shielded by suitable member (not shown) to protect the digital data signal Sa from interference by other signals and noises. This shield structure is to remove the previously-mentioned cause (2) of the signal deterioration.

Figure 2:
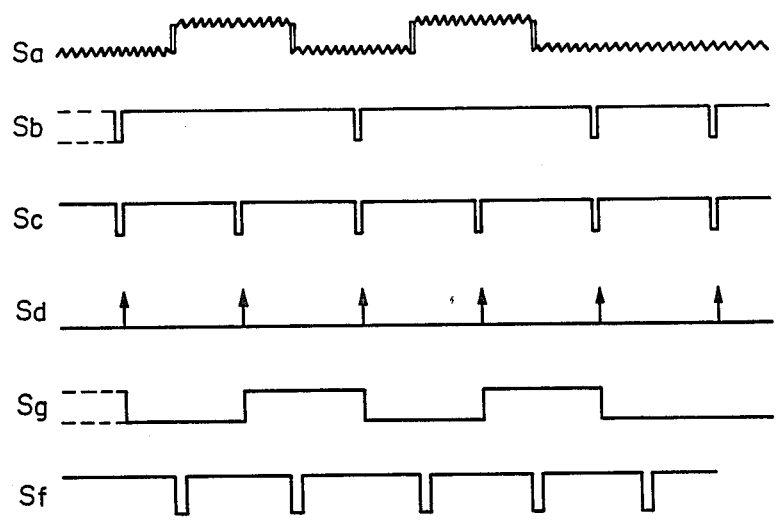
FIG. 2 is a timing diagram of waveforms of various signals developed in the interface circuit of FIG. 1.

As shown in FIG. 2, the digital data signal Sa tends to contain unwanted components, such as high frequency noise components and jitter components, which relate to the previously-mentioned cause (1) of the signal deterioration. These unwanted components are removed via signal processing described hereinafter.

The reception circuit 21 includes a generator 8 outputting a constant frequency basic clock signal. The output terminal of the clock generator 8 is connected to an input terminal of a timing control circuit 9 so that the basic clock signal is applied to the timing control circuit 9. The timing control circuit 9 generates a read clock signal Sd, a binary driver control signal Se, and a binary synchronizing signal Sf in accordance with the basic clock signal.

An input terminal of a driver 10 is connected to an output terminal of the timing control circuit 9 so that the driver 10 receives the synchronizing signal Sf. The driver 10 preferably includes a switching transistor which is made conductive and unconductive in accordance with change of the binary synchronizing signal Sf between two different level states. For example, the driver 10 is made conductive and unconductive when the synchronizing signal Sf assumes a logic state "0" and a logic state "1" respectively. An output terminal of the driver 10 is connected across a constant voltage source (not shown) via an LED 11a of the photocoupler 11 and a fixed resistor (no reference character).

When the binary synchronizing signal Sf assumes a first level state or a logic state "0", the driver 10 is made conductive so that a current from the voltage source flows through the LED 11a. This current activates the LED 11a so that the LED 11a emits light. When the synchronizing signal Sf assumes a second level state or a logic state "1", the driver 10 is made unconductive so that the current flow through the LED 11a is interrupted. The interruption of the current flow through the LED 11a deactivates the LED 11a so that the light emission from the LED 11a is also interrupted. In this way, the LED 11a generates an optical binary signal which corresponds to the binary synchronizing signal Sf.

The transmission circuit 20 includes a phototransistor 11b of the photocoupler 11. When the associated LED 11a emits light, the phototransistor 11b is made conductive. When the light emission from the LED 11a is interrupted, the phototransistor 11b becomes unconductive. Thus, the phototransistor 11b is made conductive and unconductive in accordance with the synchronizing signal Sf. The phototransistor 11b is connected across a constant voltage source (not shown) via a fixed resistor 22. When the phototransistor 11b is conductive and unconductive, a potential at the junction between the phototransistor 11b and the fixed resistor 22 goes low and high respectively. Accordingly, the potential at the junction between the phototransistor 11b and the fixed resistor 22 reflects the synchronizing signal Sf. In this way, the synchronizing signal Sf is transmitted from the reception circuit 21 to the transmission circuit 20. The junction between the phototransistor 11b and the fixed resistor 22 is connected to a control terminal of the synchronous control circuit 6 so that the synchronizing signal Sf is transmitted to the synchronous control circuit 6.

The digital data signal Sa undergoes synchronizing process in the synchronous control circuit 6. Specifically, serial segments of the digital signal Sa representing respective data are outputted from the synchronous control circuit 6 at timings determined by the synchronizing signal Sf.

The reception circuit 21 includes a driver 12. An input terminal of the driver 12 is connected to an output terminal of the timing control circuit 9 so that the driver 12 receives the binary control signal Se. The driver 12 preferably includes a switching transistor which is made conductive and unconductive in accordance with change of the binary control signal Se between two different level states. For example, the driver 12 is made conductive and unconductive when the control signal Se assumes a logic state "0" and a logic state "1" respectively. An output terminal of the driver 10 is connected across a constant voltage source (not shown) via a phototransistor 3b of the photocoupler 3 and a fixed resistor 23. The phototransistor 3b of the photocoupler 3 is included in the reception circuit 21.

When the driver 12 is conductive and unconductive, a potential Sc at the junction between the driver 12 and the phototransistor 3b goes low and high respectively. Accordingly, the potential Sc at the junction between the driver 12 and the phototransistor 3b reflects the state of the driver 12 and thus depends on the control signal Se. In other words, the driver 12 transmits the control signal Se to the phototransistor 3b in the form of a signal Sc. Specifically, as shown in FIG. 2, the phototransistor control signal Sc contains negative or inverted short pulses occuring at preset regular intervals. While the driver 12 is conductive, a phototransistor control pulse Sc is present. While the driver 12 is unconductive, a phototransistor control pulse Sc is absent.

The phototransistor 3b is made conductive when the associated LED 3a emits light. The phototransistor 3b becomes unconductive when the light emission from the LED 3a is interrupted. Thus, the phototransistor 3b is made conductive and unconductive in accordance with the digital data signal Sa. As shown in FIG. 2, provided that the driver 12 is conductive, that is, provided that a phototransistor control pulse Sc is present, a potential Sb at the junction between the phototransistor 3b and the fixed resistor 23 goes low and high when the phototransistor 3b is conductive and unconductive respectively. Accordingly, provided that a phototransistor control pulse Sc is present, the potential Sb at the junction between the phototransistor 3b and the fixed resistor 23 reflects the digital data signal Sa. In other words, provided that a phototransistor control pulse Sc is present, the digital data signal Sa from the transmission circuit 20 is allowed to travel to the reception circuit 21 in the form of a signal Sb. As shown in FIG. 2, provided that the driver 12 is unconductive, that is, provided that a phototransistor control pulse Sc is absent, the potential Sb between the phototransistor 3b and the fixed resistor 23 remains at a high level independent of the digital data signal Sa. In this way, the digital data signal Sa is sampled at timings determined by the phototransistor control pulses Sc and is thereby converted into a processed data signal Sb.

The timings of sampling of the digital data signal Sa, that is, the timings of the phototransistor control pulses Sc, are chosen to reside outside periods or intervals during which jitter components of the digital data signal Sa may occur. This timing setting removes jitter components from the processed data signal Sb. As shown in FIG. 2, the processed data signal Sb is also essentially free from high frequency noises.

The junction between the phototransistor 3b and the fixed resistor 23 is connected to a data input terminal of a D flip-flop 13 so that the processed data signal Sb is applied to the data input terminal of the D flip-flop 13. A clock pulse input terminal of the D flip-flop 13 is connected to the timing control circuit 9 so that the clock pulse input terminal of the D flip-flop 13 receives the read clock signal Sd. A non-inverting output terminal of the D flip-flop 13 is connected to a connection point or terminal 14 so that an output signal Sg from the D flip-flop 13 is applied to the connection point 14.

As shown in FIG. 2, the read clock signal Sd contains short pulses occurring at preset regular intervals. The read clock pulses Sd are synchronous with the phototransistor control pulses Sc. In addition, the read clock pulses Sd occur at moments in respective durations of the corresponding phototransistor control pulses Sc. At moments of the occurrences of the read clock pulses Sd, the logic state of the flip-flop output signal Sg equals the logic state of the processed data signal Sb. After the moment of the occurrence of a read clock pulse Sd, the logical state of the flip-flop output signal Sg remains unchanged at least until the following read clock pulse Sd occurs. In this way, the processed data signal Sb is converted into a second processed data signal Sg free from jitters and high frequency noises. The second processed data signal Sg has a fixed time delay or phase difference with respect to the original data signal Sa. If the processed data signal Sg is advanced to offset its time delay with respect to the original data signal Sa, the waveform of the processed data signal Sg is essentially the same as the waveform of the true data components of the original data signal Sa.

In summary, the original data signal Sa is wave-shaped into a delayed data signal Sg. Even if the original data signal Sa has jitter and noise components, the wave-shaping process eliminates the jitter and noise components so that a clean data signal Sg is available. The elimination of the jitter and noise components means the removal of the previously-mentioned cause (1) of the signal deterioration. In addition, the previously-mentioned cause (2) of the signal deterioration is removed by the unit isolating structure. Accordingly, both the previously-mentioned causes (1) and (2) of the signal deterioration are removed in the interface circuit of this embodiment. In cases where the interface circuit of this embodiment is applied to digital audio or video systems, the removal of the previously-mentioned causes (1) and (2) of the signal deterioration ensures excellent fidelity in sound or image reproduction.

It should be noted that each of the photocouplers 3 and 11 may be replaced by a photointerrupter, or a combination of a light emitting element, a light sensitive element, and an optical fiber connecting these elements. Furthermore, the transmission circuit 20 and the reception circuit 21 may be coupled via electromagnetic connections including transformers in place of the optical connections including the photocouplers 3 and 11.

The synchronous control circuit 6 may consist of any devices or apparatus which output digital data signals in synchronism with external synchronizing signals. For example, the synchronous control circuit 6 consists of a video tape recorder (VTR), a PCM recorder, a compact disc (CD) player, or a digital audio tape recorder (DAT).

Figure 3:
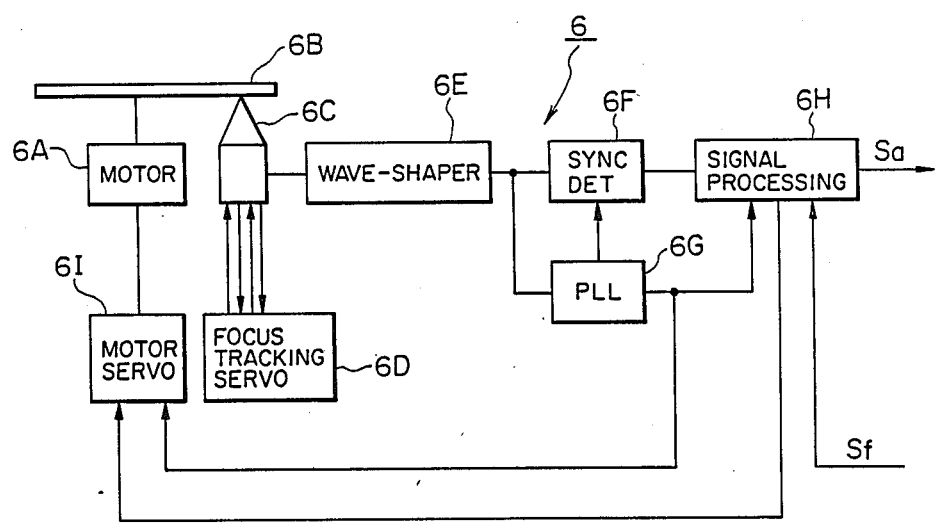
FIG. 3 is a block diagram of an example of the synchronous control circuit of FIG. 1.

FIG. 3 shows an example of the synchronous control circuit 6 which is composed of a CD player. As shown in FIG. 3, the synchronous control circuit 6 includes a spindle motor 6A rotating a compact disc 6B. An optical pickup 6C derives a data signal from the compact disc 6B. The optical pickup 6C is controlled by focus servo and tracking servo systems 6D. After processed by an analog wave shaper 6E, the data signal is applied to a synchronous detector 6F and a phase-locked loop (PLL) circuit 6G. The PLL circuit 6G regenerates clocks from the data signal. These clocks are applied to the synchronous detector 6F and a digital signal processing unit 6H. After internal synchronizing signals are detected from the data signal by the device 6F, the data signal is processed in the device 6H to form a digital data signal Sa. An external synchronizing signal Sf is applied to the digital signal processing unit 6H. The device 6H outputs the digital data signal Sa in synchronism with the external synchronizing signal Sf. The clocks from the PLL circuit 6G are applied to a motor drive servo system 6I. The digital signal processing unit 6H generates a motor control signal in accordance with the external synchronizing signal Sf. The motor control signal is applied to the motor drive servo system 6I. The motor drive servo system 6I controls the spindle motor 6A in accordance with the motor control signal and the clocks.

Figure 4:
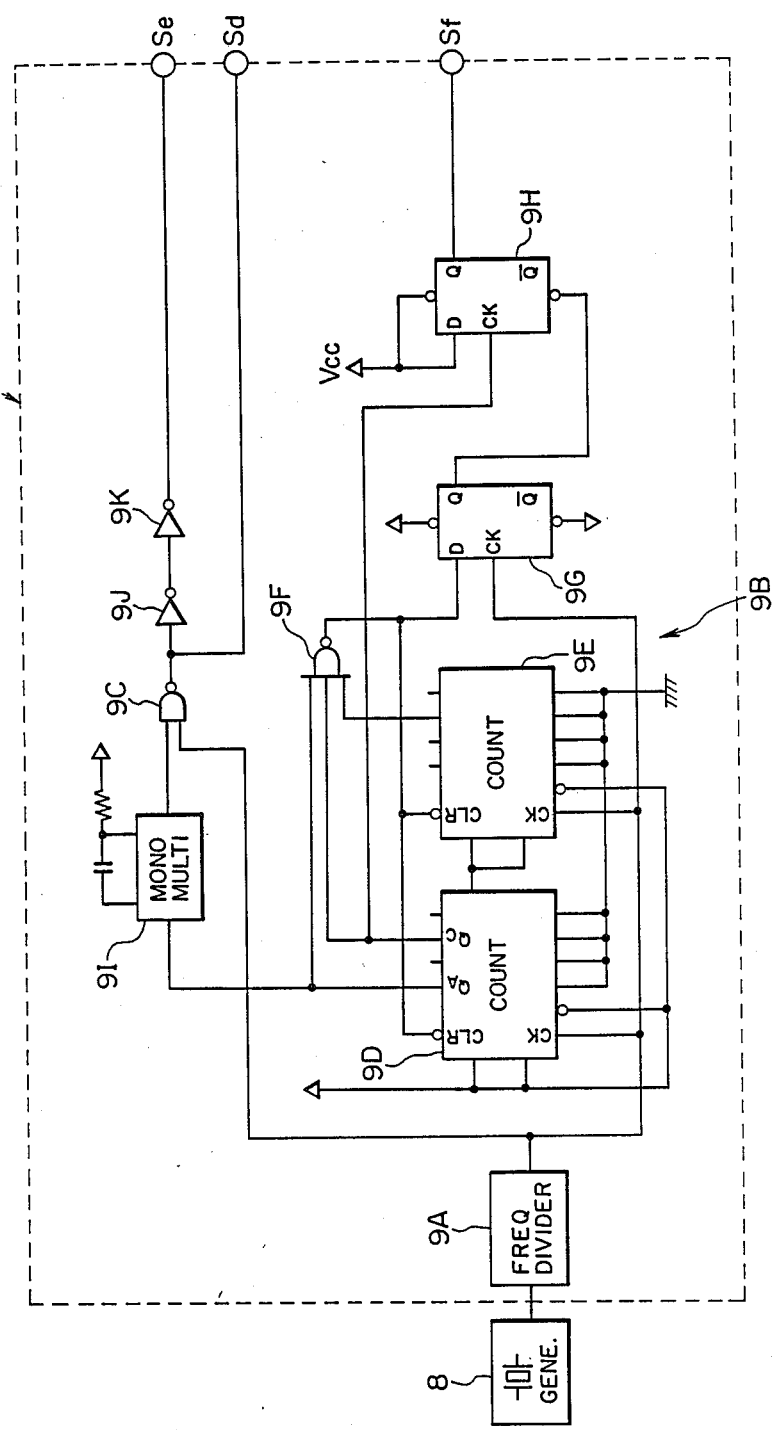
FIG. 4 is a block diagram of the timing control circuit of FIG. 1.

FIG. 4 shows an example of the timing control circuit 9 in the case where the synchronous control circuit 6 is composed of a PCM recorder including a rotatable head type VTR. As shown in FIG. 4, the timing control circuit 9 includes a first frequency divider 9A receiving a basic clock signal outputted by the generator 8. In this case, the frequency of the basic clock signal is 12.348 MHz. The first frequency divider 9A derives a signal having a frequency of 3.087 MHz from the basic clock signal through ¼ frequency dividing process. The 3.087 MHz signal is applied to a second frequency divider 9B and a first input terminal of a NAND gate 9C. The second frequency divider 9B includes a combination of hexadecimal or 4-bit counters 9D and 9E, a NAND gate 9F, and D flip-flops 9G and 9H. The second frequency divider 9B derives a synchronizing signal Sf having a frequency of 44.1 KHz through 1/70 frequency dividing process. Specifically, the combination of the counters 9D and 9E, and the NAND gate 9F derives a first 44.1 KHz signal from the 3.087 MHz signal. The first 44.1 KHz signal is applied to a data input terminal of the first D flip-flop 9G from an output terminal of the NAND gate 9F. A clock input terminal of the first D flip-flop 9G receives the 3.087 MHz signal. The first D flip-flop 9G converts the first 44.1 KHz signal into a second 44.1 KHz signal, which is applied to a clear or reset terminal of the second D flip-flop 9H. The first counter 9D has an output terminal QC generating a pulse signal representing a period corresponding to successive four pulses of the 3.087 MHz. This pulse signal is applied to a clock input terminal of the second D flip-flop 9H. A data input terminal of the second D flip-flop 9H is subjected to a constant positive potential Vcc. The second D flip-flop 9H makes the duration of a synchronizing pulse Sf equal to a period corresponding to successive four pulses of the 3.087 MHz signal. The first counter 9D has an output terminal QA generating a signal with a frequency of 1.5435 MHz. A monostable multivibrator 9I derives a preset width pulse signal from the 1.5435 MHz signal. This preset width pulse signal is applied to a second input terminal of the NAND gate 9C. The NAND gate 9C generates a read clock signal Sd in accordance with the preset width pulse signal and the 3.087 MHz signal. The frequency of the read clock signal Sd is 1.5435 MHz. The series combination of inverters 9J and 9K derives a driver control signal Se from the signal outputted by the NAND gate 9C. The frequency of the driver control signal Se is 1.5435 MHz.

The synchronizing signal Sf may contain pulses which occur at fixed intervals corresponding to periods which respective data of the digital signal Sa occupy. The waveform of such a synchronizing signal Sf is shown in FIG. 2. In this case, the frequency of the synchronizing signal Sf is equal to the frequency of the phototransistor control signal Sc and the read clock signal Sd.

DESCRIPTION OF THE SECOND PREFERRED EMBODIMENT

Figure 5:
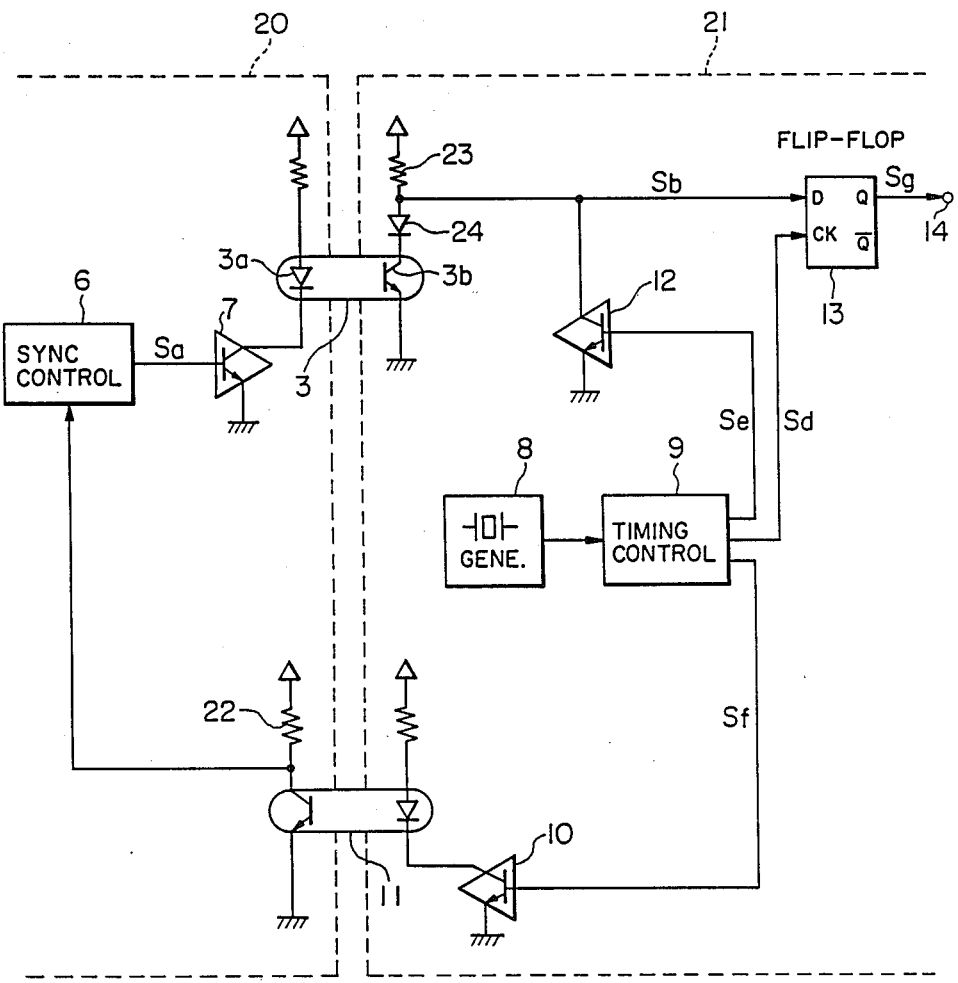
FIG. 5 is a diagram of an interface circuit according to a second embodiment of this invention.

FIG. 5 shows a second embodiment of this invention, which is similar to the embodiment of FIGS. 1-4 except for the following design changes.

Figure 6:
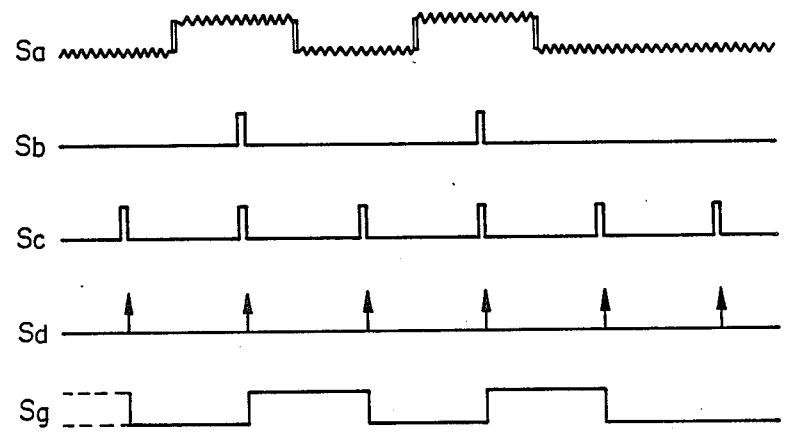
FIG. 6 is a timing diagram of waveforms of various signals developed in the interface circuit of FIG. 5.

As shown in FIG. 5, the phototransistor 3b of the photocoupler 3 is connected across a constant voltage source (not shown) via a diode 24 and the fixed resistor 23. The output terminal of the driver 12 is connected across the series combination of the phototransistor 3b and the diode 24. The timing control circuit 9 outputs a control signal Sc to the input terminal of the driver 12. As shown in FIG. 6, the driver control signal Sc contains positive or non-inverted pulses occurring at fixed regular intervals. The driver 12 is made conductive and unconductive in accordance with the control pulse signal Sc. For example, the driver 12 is made conductive and unconductive when a driver control pulse Sc is absent and present respectively. The junction between the diode 24 and the fixed resistor 23 is connected to the data input terminal of the D flip-flop 13.

The timing control circuit 9 may be similar to the timing control circuit of FIG. 4 except for the following modification. One of the inverters 9J and 9K (see FIG. 4) is omitted from the timing control circuit 9.

In cases where the driver 12 is made unconductive by the control signal Sc, when the LED 3a of the photocoupler 3 emits light, the phototransistor 3b is made conductive so that a current flows through the fixed resistor 23, the diode 24, and the phototransistor 3b. In the same cases, when the light emission from LED 3a is interrupted, the current flow through the elements 3b, 23, and 24 is inhibited. Accordingly, in cases where the driver 12 is unconductive, a potential Sb at the junction between the diode 24 and the fixed resistor 23 essentially changes between two different levels in accordance with the allowance and inhibition of the light emission from the LED 3a so that the potential Sb reflects the digital data signal Sa as shown in FIG. 6. In other words, the digital data signal Sa from the transmission unit 20 is transmitted to the reception unit 21 in the form of a digital signal Sb.

In cases where the driver 12 is made conductive by the control signal Sc, the digital signal Sb remains in the lower level state independent of the digital data signal Sa.

The relative timings of the control pulses Sc and the read clock pulses Sd are chosen so that the D flip-flop 13 samples the digital signal Sb at moments which reside outside periods or intervals during which the signal Sb is forcedly held at the lower level state by the driver 12.

DESCRIPTION OF THE THIRD PREFERRED EMBODIMENT

Figure 7:
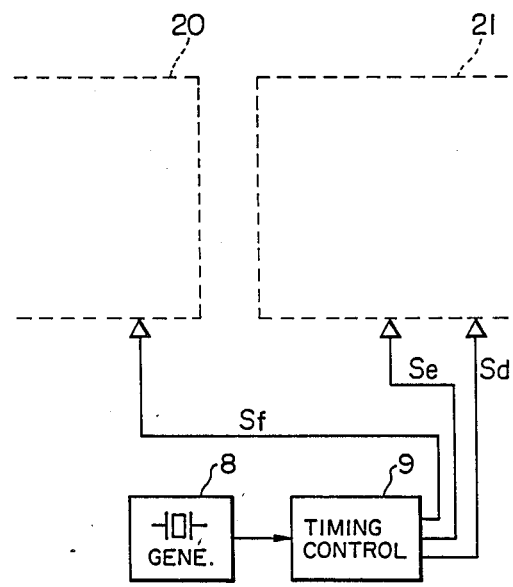
FIG. 7 is a block diagram of an interface circuit according to a third embodiment of this invention.

FIG. 7 shows a third embodiment of this invention, which is similar to the embodiment of FIGS. 1-4 except for the following design changes.

As shown in FIG. 7, in this embodiment, the clock generator 8 and the timing control circuit 9 are located outside both the transmission circuit 20 and the reception circuit 21. The driver 10 and the photocoupler 11 (see FIG. 1) are omitted from this embodiment. The timing control circuit 9 is connected to the synchronous control circuit 6 (see FIG. 1) within the transmission circuit 20 so that the synchronous signal Sf from the timing control circuit 9 is applied to the synchronous control circuit 6.

A photocoupler may be disposed in the connection between the timing control circuit 9 and the synchronous control circuit 6 (see FIG. 1) within the transmission circuit 20 to prevent electrical connection between the transmission circuit 20 and the reception circuit 21 via the timing control circuit 9.

DESCRIPTION OF THE FOURTH PREFERRED EMBODIMENT

Figure 8:
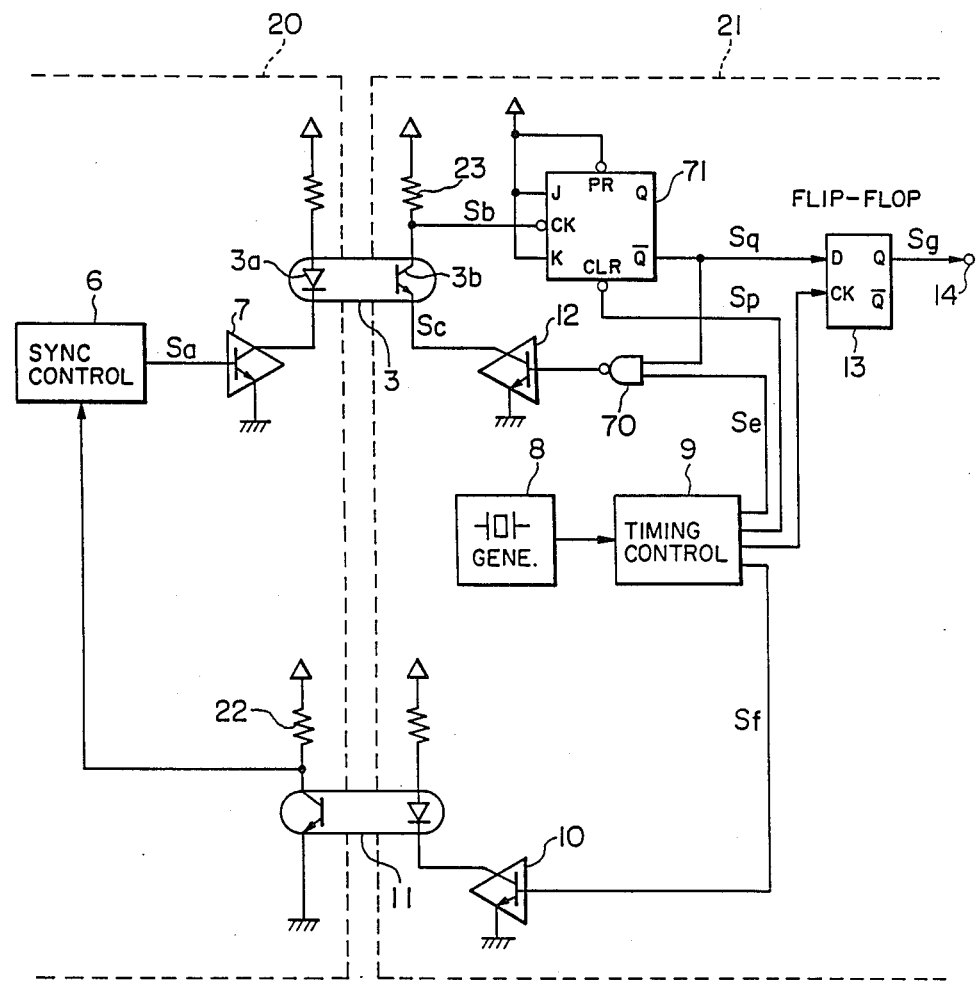
FIG. 8 is a diagram of an interface circuit according to a fourth embodiment of this invention.

FIG. 8 shows a fourth embodiment of this invention, which is similar to the embodiment of FIGS. 1-4 except for the following design changes.

As shown in FIG. 8, the reception circuit 21 includes a NAND gate 70 and a J-K flip-flop 71. An output terminal of the timing control circuit 9 is connected to a first input terminal of the NAND gate 70 so that the driver control signal Se is applied to the first input terminal of the NAND gate 70. An output terminal of the NAND gate 70 is connected to the input terminal of the driver 12 so that an output signal from the NAND gate 70 is applied to the input terminal of the driver 12. The timing control circuit 9 derives a pulse signal Sp from the basic clock signal outputted by the generator 8. An output terminal of the timing control circuit 9 is connected to a clear terminal of the J-K flip-flop 71 so that the pulse signal Sp is applied to the clear terminal of the J-K flip-flop 71.

Figure 9:
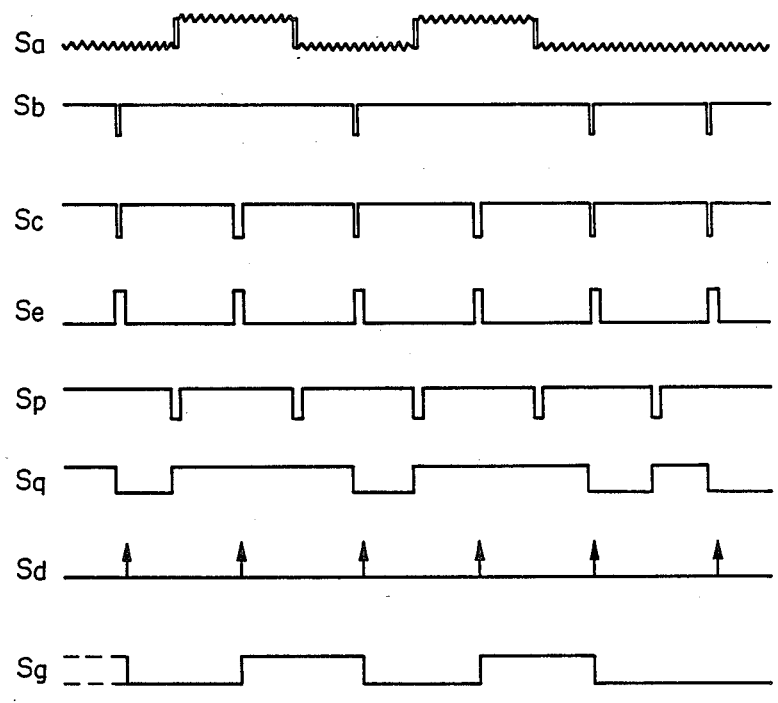
FIG. 9 is a timing diagram of waveforms of various signals developed in the interface circuit of FIG. 8.

As shown in FIG. 9, the signal Sp contains pulses occurring at fixed regular intervals. The frequency of the pulses Sp is the same as the frequency of the driver control pulses Se. The timing of the occurrence of these pulses Sp differs from the timing of the occurrence of the driver control pulses Se.

The timing control circuit 9 may be similar to the timing control circuit of FIG. 4 except for the following modification. One of the inverters 9J and 9K (see FIG. 4) is omitted from the timing control circuit 9. The timing control circuit includes a delay circuit which derives the pulse signal Sp from the driver control signal Se.

The junction between the fixed resistor 23 and the phototransistor 3b is connected to a clock input terminal of the J-K flip-flop 71 so that the signal Sb is applied to the clock input terminal of the J-K flip-flop 71. An inverting output terminal of the J-K flip-flop 71 is connected to the data input terminal of the D flip-flop 13 and a second input terminal of the NAND gate 70 so that an output signal Sq from the J-K flip-flop 71 is applied to the data input terminal of the D flip-flop 13 and the second input terminal of the NAND gate 70. A J-terminal and a K-terminal of the J-K flip-flop 71 are subjected to a positive constant voltage.

As shown in FIG. 9, when a pulse Sp is applied to the clear terminal of the J-K flip-flop 71, the output signal Sq from the J-K flip-flop 71 moves to or remains at a logic state "1". This logic "1" signal Sq is applied to the NAND gate 70. Then, a driver control pulse Se is applied to the NAND gate 70, changing a state of the output signal from the NAND gate 70 and thereby making the driver 12 conductive.

In cases where no current flows through the LED 3a, the signal Sb remains in a logic state "1" independent of the change of the state of the driver 12, since the phototransistor 3b remains unconductive.

In cases where a current flows through the LED 3a, when the driver 12 becomes conductive, the signal Sb changes to a logic state "0". This logic "0" signal Sb changes the flip-flop output signal Sq to a logic state "0", thereby moving the output signal of the NAND gate 70 to a logic state "1" and making the driver 12 unconductive. Thus, the driver 12 remains conductive for only a short interval. This is advantageous in removing unwanted components from the data signal transmission between the transmission circuit 20 and the reception circuit 21.

DESCRIPTION OF THE FIFTH PREFERRED EMBODIMENT

Figure 10:
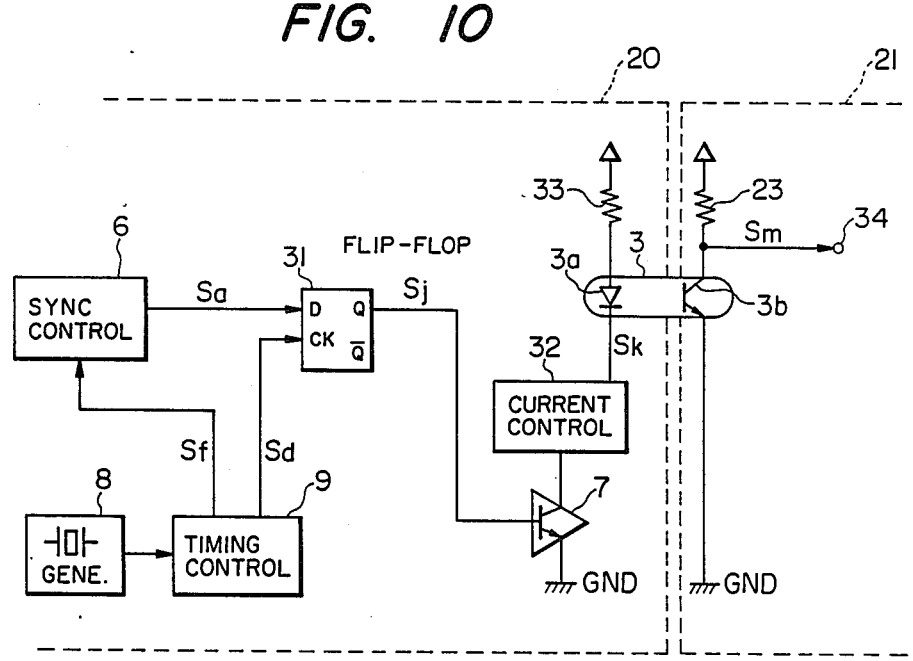
FIG. 10 is a diagram of an interface circuit according to a fifth embodiment of this invention.

With reference to FIG. 10 showing a fifth embodiment of this invention, a digital signal processing unit includes a signal transmission circuit 20. A digital-to-analog (D/A) converting and analog signal processing unit includes a signal reception circuit 21 optically connected to the transmission circuit 20 via a photocoupler 3. The transmission circuit 20 outputs an optical data signal to the reception circuit 21 via the photocoupler 3.

The transmission circuit 20 and the reception circuit 21 are mutually electrically isolated to remove the previously-mentioned cause (2) of the signal deterioration as in the embodiment of FIGS. 1-4.

The transmission circuit 20 includes a synchronous control circuit 6 outputting a synchronized digital or binary data signal Sa. The synchronous control circuit 6 is similar to that in the embodiment of FIGS. 1-4. An output terminal of the synchronous control circuit 6 is connected to a data input terminal of a D flip-flop 31 so that the digital data signal Sa is applied to the data input terminal of the D flip-flop 31.

Figure 11:
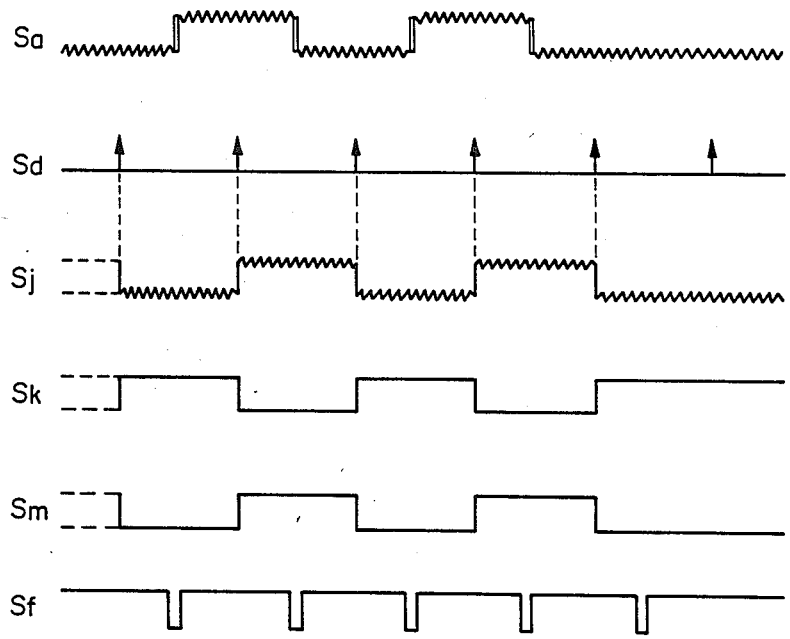
FIG. 11 is a timing diagram of waveforms of various signals developed in the interface circuit of FIG. 10.

As shown in FIG. 11, the digital data signal Sa tends to contain unwanted components, such as high frequency noise components and jitter components, which relate to the previously-mentioned cause (1) of the signal deterioration. These unwanted components are removed via signal processing described hereinafter.

The transmission circuit 20 includes a generator 8 outputting a constant frequency basic clock signal. The output terminal of the clock generator 8 is connected to an input terminal of a timing control circuit 9 so that the basic clock signal is applied to the timing control circuit 9. The timing control circuit 9 generates a read clock signal Sd and a binary synchronizing signal Sf in accordance with the basic clock signal.

The timing control circuit 9 is similar to that is the embodiment of FIGS. 1-4 except for the following design change. A section for generating a driver control signal Se (see FIG. 1) is omitted from this timing control circuit 9. Specifically, the timing control circuit 9 may be similar to that in FIG. 4 except for the following modification. The multivibrator 9I, the NAND gate 9C, and the inverters 9J and 9K (see FIG. 4) are omitted from this timing control circuit 9. The signal from the output terminal QA of the first counter 9D (see FIG. 4) is directly used as the synchronizing read clock signal Sd.

An output terminal of the timing control circuit 9 is connected to a control terminal of the synchronous control circuit 6 so that the synchronizing signal Sf is applied to the synchronous control circuit 6. The digital data signal Sa undergoes synchronizing process in the synchronous control circuit 6. Specifically, serial segments of the digital signal Sa representing respective data are outputted from the synchronous control circuit 6 at timings determined by the synchronizing signal Sf.

Another output terminal of the timing control circuit 9 is connected to a clock input terminal of the D flip-flop 31 so that the read clock signal Sd is applied to the clock input terminal of the D flip-flop 31. As shown in FIG. 11, the read clock signal Sd contains short pulses occurring at preset regular intervals. The D flip-flop 31 samples the digital data signal Sa at the moment of the occurrence of a read clock pulse Sd and generates a processed data signal Sj representative of the sampled data. In other words, the digital data signal Sa is converted or wave-shaped into a corresponding processed data signal Sj. The processed data signal Sj is outputted via a non-inverting output terminal of the D flip-flop 31.

The timings of sampling of the digital data signal Sa, that is, the timings of the read clock pulses Sd, are chosen to reside outside periods or intervals during which jitter components of the digital data signal Sa may occur. This timing setting removes jitter components from the processed data signal Sj. It should be noted that the processed data signal Sj tends to contain high frequency noises as shown in FIG. 11.

As shown in FIG. 11, the processed data signal Sj has a fixed time delay or phase difference with respect to the original data signal Sa. If the processed data signal Sj is advanced to offset this time delay with respect to the original data signal Sa, the waveform of the true data components of the processed data signal Sj is essentially the same as the waveform of the true data components of the original data signal Sa.

The non-inverting output terminal of the D flip-flop 31 is connected to an input terminal of a driver 7 so that the digital processed data signal Sj is applied to the driver 7. The driver 7 preferably includes a switching transistor which is made conductive and unconductive in accordance with change of the digital data signal Sj between two different level states. For example, the driver 7 is made conductive and unconductive when the digital data signal Sj assumes a logic state "0" and a logic state "1" respectively. An output terminal of the driver 7 is connected across a constant voltage source (not shown) via a current control circuit 32, a light-emitting diode (LED) 3a of the phototransistor 3, and a fixed resistor 33.

When the digital data signal Sj assumes a first level state or a logic state "0", the driver 7 is made conductive so that a current Sk from the voltage source flows through the LED 3a and the current control circuit 32. This current Sk activates the LED 3a so that the LED 3a emits light. When the digital data signal Sj assumes a second level state or a logic state "1", the driver 7 is made unconductive so that the current flow through the LED 3a and the current control circuit 32 is interrupted. The interruption of the current flow through the LED 3a deactivates the LED 3a so that the light emission from the LED 3a is also interrupted. In this way, the LED 3a generates an optical binary signal which corresponds to the digital data signal Sj.

While the driver 7 remains conductive so that the current Sk continues to flow through the LED 3a, the current control circuit 32 regulates this current at a preset fixed level. The current regulation by the control circuit 32 smooths the current Sk and thus removes high frequency noises or ripples from the current Sk as shown in FIG. 11. While the driver 7 remains unconductive, the current Sk is null regardless of the operation of the current control circuit 32. As shown in FIG. 11, the waveform of the current Sk through the LED 3a essentially coincides with the waveform of the digital data signal Sj but is free from high frequency noises. Since jitter components are removed from the digital data signal Sj and high frequency noise components are removed from the current Sk through the LED 3a, the optical binary signal emitted from the LED 3a is free from these unwanted components related to the previously-mentioned cause (1) of the signal deterioration. In this way, this embodiment removes the previously-mentioned cause (1) of the signal deterioration.

The reception circuit 21 includes a phototransistor 3b of the photocoupler 3. The phototransistor 3b is connected across a constant voltage source via a fixed resistor 23. The phototransistor 3b is made conductive when the associated LED 3a emits light. The phototransistor 3b becomes unconductive when the light emission from the LED 3a is interrupted. Thus, the phototransistor 3b is made conductive and unconductive in accordance with the optical binary signal from the LED 3a which corresponds to the digital data signal Sj.

When the phototransistor 3b is conductive, a current from the related voltage source flows through the fixed resistor 23 and the phototransistor 3b and a potential Sm at the junction between the fixed resistor 23 and the phototransistor 3b assumes a low level. When the phototransistor 3b is unconductive, the current flow through the fixed resistor 23 and the phototransistor 3b is interrupted and the potential Sm at the junction between the fixed resistor 23 and the phototransistor 3b assumes a high level. Accordingly, the potential Sm at the junction between the fixed resistor 23 and the phototransistor 3b reflects the digital data signal Sj. In other words, the digital data signal Sj from the transmission circuit 20 is transmitted to the reception circuit 21 in the form of a digital signal Sm. As shown in FIG. 11, the waveform of the digital signal Sm essentially coincides with the waveform of the digital data signal Sj. Since the optical signal transmitted from the LED 3a to the phototransistor 3b contains neither jitter components nor high frequency noise components, the digital signal Sm is free from these unwanted components.

The junction between the fixed resistor 23 and the phototransistor 3b is connected to a terminal or connection point 34 so that the digital signal Sm is applied to the terminal 34.

In summary, during data transmission from the transmission circuit 20 to the reception circuit 21, the original data signal Sa is wave-shaped into a corresponding data signal Sm. Even if the original data signal Sa has jitter and noise components, the wave-shaping process eliminates the jitter and noise components so that a clean data signal Sm is available. The elimination of the jitter and noise components means the removal of the previously-mentioned cause (1) of the signal deterioration. In addition, the previously-mentioned cause (2) of the signal deterioration is removed by the unit isolating structure. Accordingly, both the previously-mentioned causes (1) and (2) of the signal deterioration are removed in the interface circuit of this embodiment. In cases where the interface circuit of this embodiment is applied to digital audio or video systems, the removal of the previously-mentioned causes (1) and (2) of the signal deterioration ensures excellent fidelity in sound or image reproduction.

It should be noted that the photocoupler 3 may be replaced by a photointerrupter, or a combination of a light emitting element, a light sensitive element, and an optical fiber connecting these elements. Furthermore, the transmission circuit 20 and the reception circuit 21 may be coupled via an electromagnetic connection including a transformer in place of the optical connection including the photocoupler 3. In addition, the clock generator 8 may be located outside the transmission circuit 20.

The synchronizing signal Sf may contain pulses which occur at fixed regular intervals corresponding to periods which respective data of the digital signal Sa occupy. The waveform of such a synchronizing signal Sf is shown in FIG. 11. In this case, the frequency of the synchronizing signal Sf is equal to the frequency of the synchronizing read clock signal Sd.

The current control circuit 32 may composed of a known constant current circuit. The current control circuit 32 may also be composed of a known current limiting circuit which serves to hold a current equal to or below a preset upper limit. In this case, the current limiting circuit is designed so that when the driver 7 is conductive, the current limiting circuit acts in a saturated state and thus the current limiting circuit holds the current through the LED 3a at a preset level.

The series combination of the current control circuit 32, the LED 3a, the fixed resistor 33, the driver 7, and the voltage source (not shown) may be replaced by a series combination of a known constant current supply, the LED 3a, and the driver 7.

DESCRIPTION OF THE SIXTH PREFERRED EMBODIMENT

Figure 12:
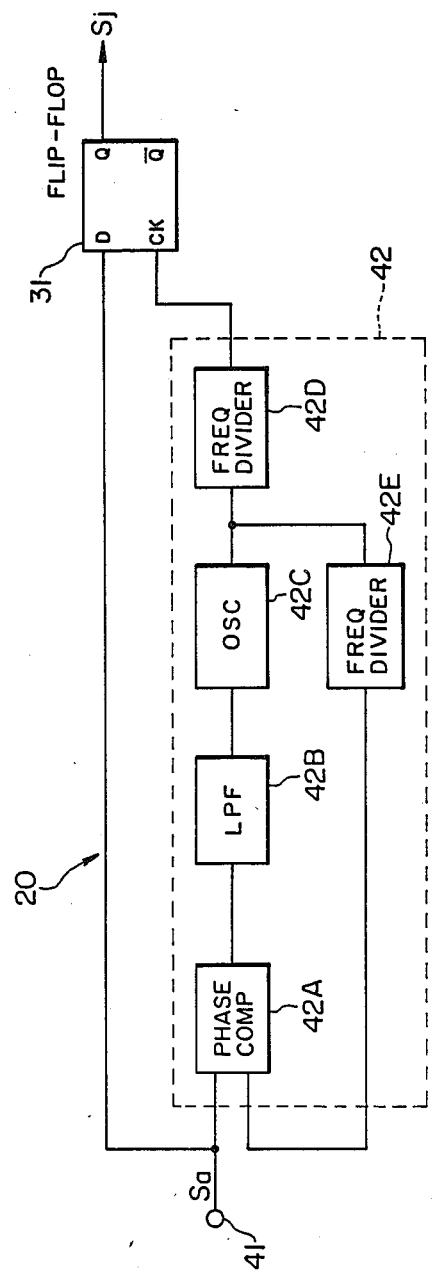
FIG. 12 is a block diagram of an interface circuit according to a sixth embodiment of this invention.

FIG. 12 shows a sixth embodiment of this invention, which is similar to the embodiment of FIGS. 10 and 11 except for the following design changes.

As shown in FIG. 12, in this embodiment, the transmission circuit 20 includes a connection point or terminal 41 subjected to the digital data signal Sa. The point 41 is connected to the data input terminal of the D flip-flop 31 so that the digital data signal Sa is applied to the data input terminal of the D flip-flop 31.

The clock generator 8 and the timing control circuit 9 (see FIG. 10) are omitted from this embodiment. The transmission circuit 20 includes a synchronizing signal generator 42.

The synchronizing signal generator 42 includes a phase comparator 42A, a low pass filter (LPF) 42B, a voltage controlled oscillator 42C, and frequency dividers 42D and 42E. The connection point 41 is connected to a first input terminal of the phase comparator 42A so that the digital data signal Sa is applied to the first input terminal of the phase comparator 42A. An output terminal of the phase comparator 42A is connected to an input terminal of the low pass filter 42B so that an output signal from the phase comparator 42A is applied to the low pass filter 42B. An output terminal of the low pass filter 42B is connected to a control terminal of the oscillator 42C so that an output signal from the low pass filter 42B is applied to he control terminal of the oscillator 42C. The output signal from the low pass filter 42B controls the oscillator 42C. An output terminal of the oscillator 42C is connected to input terminals of the frequency dividers 42D and 42E so that an output signal from the oscillator 42C is applied to the frequency dividers 42D and 42E. The device 42D derives a synchronizing read clock signal Sd from the signal of the oscillator 42C through frequency dividing process. An output terminal of the frequency divider 42D is connected to the clock input terminal of the D flip-flop 31 so that the synchronizing read clock signal Sd is applied to the clock input terminal of the D flip-flop 31. The device 42E derives a frequency lowered signal from the signal of the oscillator 42C through frequency dividing process. An output terminal of the frequency divider 42E is connected to a second input terminal of the phase comparator 42A so that the frequency lowered signal is applied to the second input terminal of the phase comparator 42A. The device 42A compares the phases of the digital data signal Sa and the frequency lowered signal and outputs a signal reflecting the phase comparison.

The generator 42 derives a synchronizing read clock signal Sd from the digital data signal Sa. The synchronizing signal Sd contains short pulses synchronous with the digital data signal Sa. The D flip-flop 31 samples the digital data signal Sa at a moment of the occurrence of a read clock Sd. The timing of the occurrence of read clocks Sd depends on a time constant of the low pass filter 42B. The time constant of the low pass filter 42B is chosen so that the synchronizing read clocks Sd occur at moments outside intervals or periods during which jitter components of the digital data signal Sa may occur.

What is claimed is:

1. An interface circuit for transmitting a digital data signal from a transmission unit to a reception unit, the interface circuit comprising:
   (a) photo coupling means optically connecting the transmission unit and the reception unit, the photo coupling means including a photo emitter and a photo receptor connected via an optical path, the photo emitter being disposed in the transmission unit and provided with a transmission digital data signal, said photo emitter generating an optical signal corresponding to the transmission digital data signal, the photo receptor disposed in the reception unit and receiving the optical signal, the photo receptor converting the optical signal into a corresponding reception digital signal; and
   (b) means for preventing the reception digital signal from being contaminated by jitter components and high frequency noise components;
   the preventing means comprising means for generating short pulses in synchronism with a transmission digital data signal, and means for enabling the receptor with the short pulses, wherein the receptor samples the optical signal and converts the sampled optical signal into the reception digital signal in response to said short pulses.

2. The interface circuit of claim 1 wherein the jitter removing means and the noise removing means comprise a control driver operating at a timing outside a period during which jitter components of the digital data signal tend to occur, means for generating a processed signal in accordance with the operation timing of the control driver while a transmission element of the coupling device remains active, a D flip-flop having a data input terminal receiving the processed signal and having a clock input terminal, means for generating a clock timing concurrent with the operation timing of the control driver, and means for applying the clock to the clock input terminal of the D flip-flop.

3. The interface circuit of claim 1 wherein said receptor-enabling-means comprises switching means connected in series with the receptor for selectively allowing and interrupting a current through the receptor in response to said short pulses.

4. The interface circuit of claim 1 where in said receptor-enabling-means comprises switching means connected in parallel with the receptor for selectively unshunting and shunting an output of the receptor to a ground in response to said short pulses.

* * * * *